United States Patent
Kikuchi et al.

(10) Patent No.: US 12,536,885 B2
(45) Date of Patent: Jan. 27, 2026

(54) INFORMATION PROCESSING APPARATUS THAT CHANGES PROCESSING MODES IN ACCORDANCE WITH ROTATION ANGLES OF THE DISPLAY

(71) Applicant: NEC Corporation, Tokyo (JP)

(72) Inventors: Takahiro Kikuchi, Tokyo (JP); Jun Nishio, Tokyo (JP); Shozo Fujino, Tokyo (JP); Masahiko Enomoto, Tokyo (JP); Masashi Imamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/835,386

(22) PCT Filed: Feb. 15, 2022

(86) PCT No.: PCT/JP2022/005943
§ 371 (c)(1),
(2) Date: Aug. 2, 2024

(87) PCT Pub. No.: WO2023/157075
PCT Pub. Date: Aug. 24, 2023

(65) Prior Publication Data
US 2025/0174094 A1    May 29, 2025

(51) Int. Cl.
*G07G 1/01* (2006.01)
(52) U.S. Cl.
CPC ..................... *G07G 1/01* (2013.01)
(58) Field of Classification Search
CPC .............................. G07G 1/0018; G07G 1/01
USPC ........................................................ 235/383
See application file for complete search history.

(56) References Cited

U.S. PATENT DOCUMENTS

| 2016/0051067 A1* | 2/2016 | Law | G07G 1/01 |
| | | | 361/679.22 |
| 2019/0026715 A1* | 1/2019 | Furuya | G06Q 20/204 |

FOREIGN PATENT DOCUMENTS

| JP | 2014-235647 A | 12/2014 |
| JP | 2015-118512 A | 6/2015 |
| JP | 2019-053049 A | 4/2019 |
| JP | 2019-153049 A | 9/2019 |

OTHER PUBLICATIONS

Machine translation of JP 2015118512 retrieved from European Patent Office on Mar. 14, 2025 (Year: 2025).*
International Search Report for PCT Application No. PCT/JP2022/005943, mailed on Apr. 26, 2022.

* cited by examiner

*Primary Examiner* — Suezu Ellis
(74) *Attorney, Agent, or Firm* — Sughrue Mion, PLLC

(57) ABSTRACT

An information processing apparatus (10) is used in a store, and includes a display (110) and a computation processing unit (142). The display (110) is capable of rotating about an axis of rotation in a direction intersecting a display surface. The computation processing unit (142) changes processing modes according to an angle of the display (110). The processing modes include a first mode relevant to a first application and a second mode relevant to a second application different from the first application. One example of the first application is settlement processing for a product being sold in a store.

13 Claims, 7 Drawing Sheets

INFORMATION PROCESSING APPARATUS THAT CHANGES PROCESSING MODES IN ACCORDANCE WITH ROTATION ANGLES OF THE DISPLAY

This application is a National Stage Entry of PCT/JP2022/005943 filed on Feb. 15, 2022, the contents of all of which are incorporated herein by reference, in their entirety.

TECHNICAL FIELD

The present invention relates to an information processing apparatus, a control method of the information processing apparatus, and a storage medium.

BACKGROUND ART

An information processing apparatus including a display unit is used for various applications. Then, such an information processing apparatus may have a plurality of functions. Patent Document 1 describes that a sales data processing apparatus such as a cash register, an electronic register, a cash register, or a point of sales (POS) terminal changes processing modes according to an orientation of a display unit. The document exemplifies, as examples of the processing modes, a registration processing mode for registering a predetermined procedure and an approval processing mode for approving a content registered in the registration processing mode. The document further exemplifies, as the approval processing mode, an inspection processing mode for performing inspection of sales, a settlement processing mode for settling sales on the day, and a confirmation processing mode for asking a customer to confirm a registered content.

Note that, Patent Document 2 describes that a display apparatus selects an image to be displayed on a display according to an angle of rotation of the display. The document exemplifies, as the image to be displayed on the display, a video content of television broadcasting, an image imaged by an image sensor included in the display apparatus, a web page, a photo, and an e-mail acquired from an apparatus or the like such as an external server, and an image generated according to an acquired script.

RELATED DOCUMENT

Patent Document

Patent Document 1: Japanese Patent Application Publication No. 2015-118512
Patent Document 2: Japanese Patent Application Publication No. 2019-153049

DISCLOSURE OF THE INVENTION

Technical Problem

In recent years, a plurality of types of information processing apparatuses for mutually different applications are used in a store. However, the display apparatus described in Patent Document 2 is not intended for use in a store. Further, the processing modes being switched according to an orientation of the display unit in the sales data processing apparatus described in Patent Document 1 are merely functions within the sales data processing apparatus. Thus, the sales data processing apparatus is unable to switch applications according to an orientation of a display.

In view of the above-described problem, one example of an object of the present invention is to provide an information processing apparatus that is used in a store and is able to switch applications according to an orientation of a display, a control method of the information processing apparatus, and a storage medium.

Solution to Problem

According to one aspect of the present invention, provided is an information processing apparatus being used in a store, including:
 a display capable of rotating about an axis of rotation in a direction intersecting a display surface; and
 a computation processing unit that changes processing modes according to an angle of the display, wherein
 the processing mode includes a first mode relevant to a first application and a second mode relevant to a second application different from the first application.

According to one aspect of the present invention, provided is a control method of an information processing apparatus controlling a processing mode of an information processing apparatus being used in a store,
 the information processing apparatus including a display capable of rotating about an axis of rotation in a direction intersecting a display surface,
 the control method including changing processing modes of the information processing apparatus according to an angle of the display, wherein
 the processing mode includes a first mode relevant to a first application and a second mode relevant to a second application different from the first application.

According to one aspect of the present invention, provided is a storage medium storing a program executable by a computer being used as a part of an information processing apparatus in a store,
 the information processing apparatus including a display capable of rotating about an axis of rotation in a direction intersecting a display surface,
 the program causing the computer to include:
 a function of acquiring angle information indicating an angle of the display; and
 a function of changing processing modes of the information processing apparatus according to an angle of the display included in the information processing apparatus, wherein
 the processing mode includes a first mode relevant to a first application and a second mode relevant to a second application different from the first application.

Advantageous Effects of Invention

According to one aspect of the present invention, an information processing apparatus that is used in a store and is able to switch applications according to an orientation of a display, a control method of the information processing apparatus, and a storage medium can be provided.

BRIEF DESCRIPTION OF THE DRAWINGS

The above-described objective and other objectives, features and advantages are more apparent from the following preferred example embodiment and the accompanying drawings.

EXAMPLE EMBODIMENT

Hereinafter, an example embodiment of the present invention will be described by using the drawings. Note that, a similar component is assigned with a similar reference sign throughout all the drawings, and description therefor will be omitted as appropriate.

Figure 1:
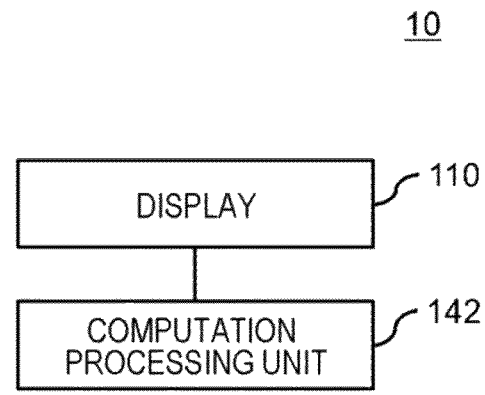
FIG. 1 is a diagram illustrating an overview of an information processing apparatus according to an example embodiment.

FIG. 1 is a diagram illustrating an overview of an information processing apparatus 10 according to an example embodiment. The information processing apparatus 10 is used in a store, and includes a display 110 and a computation processing unit 142. The display 110 is capable of rotating about an axis of rotation in a direction intersecting a display surface. The computation processing unit 142 changes processing modes according to an angle of the display 110. The processing modes include a first mode relevant to a first application and a second mode relevant to a second application different from the first application.

The information processing apparatus 10 is able to switch applications according to an orientation of a display. Hereinafter, a detailed example of the information processing apparatus 10 will be described.

Figure 2:
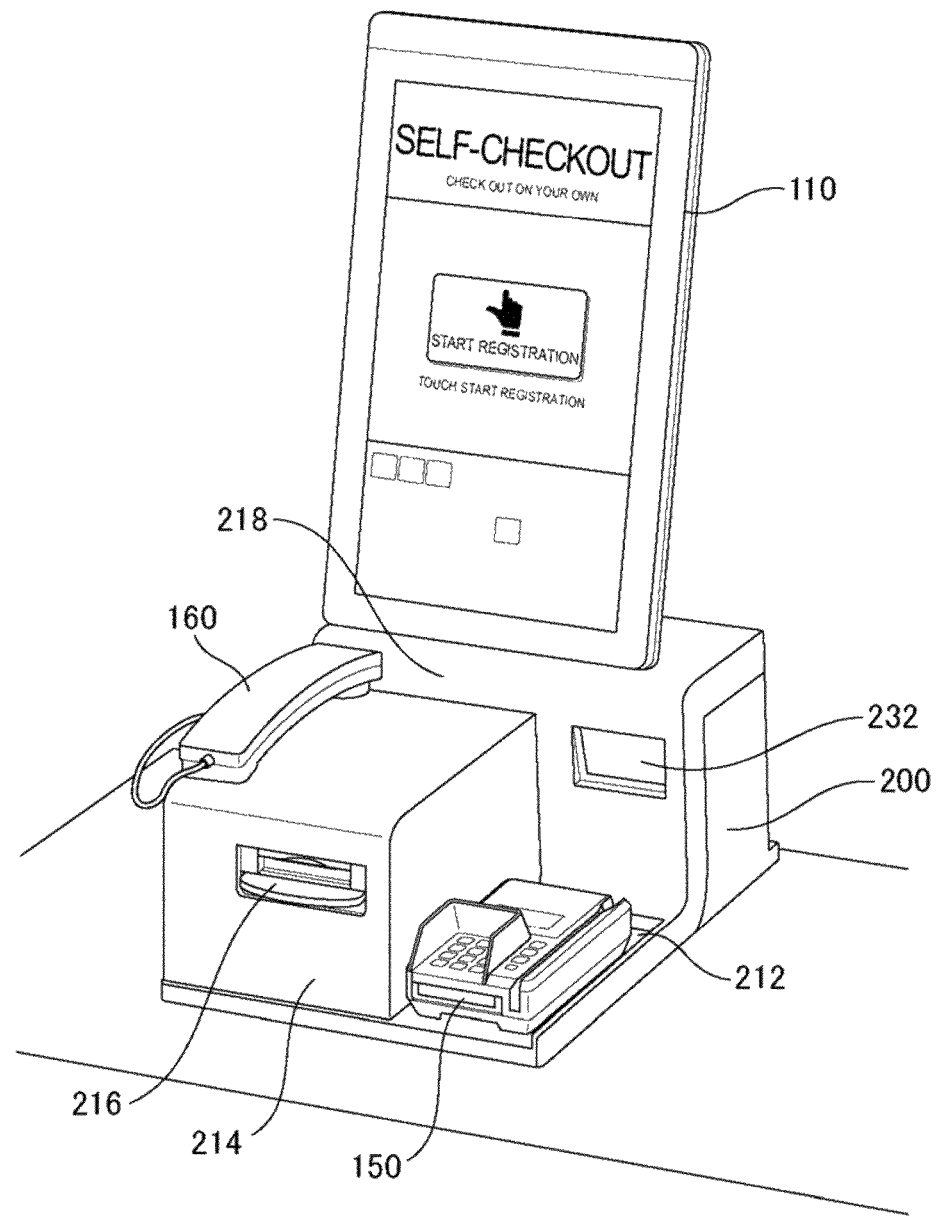
FIG. 2 is a perspective view of the information processing apparatus as viewed from a front side.
Figure 3:
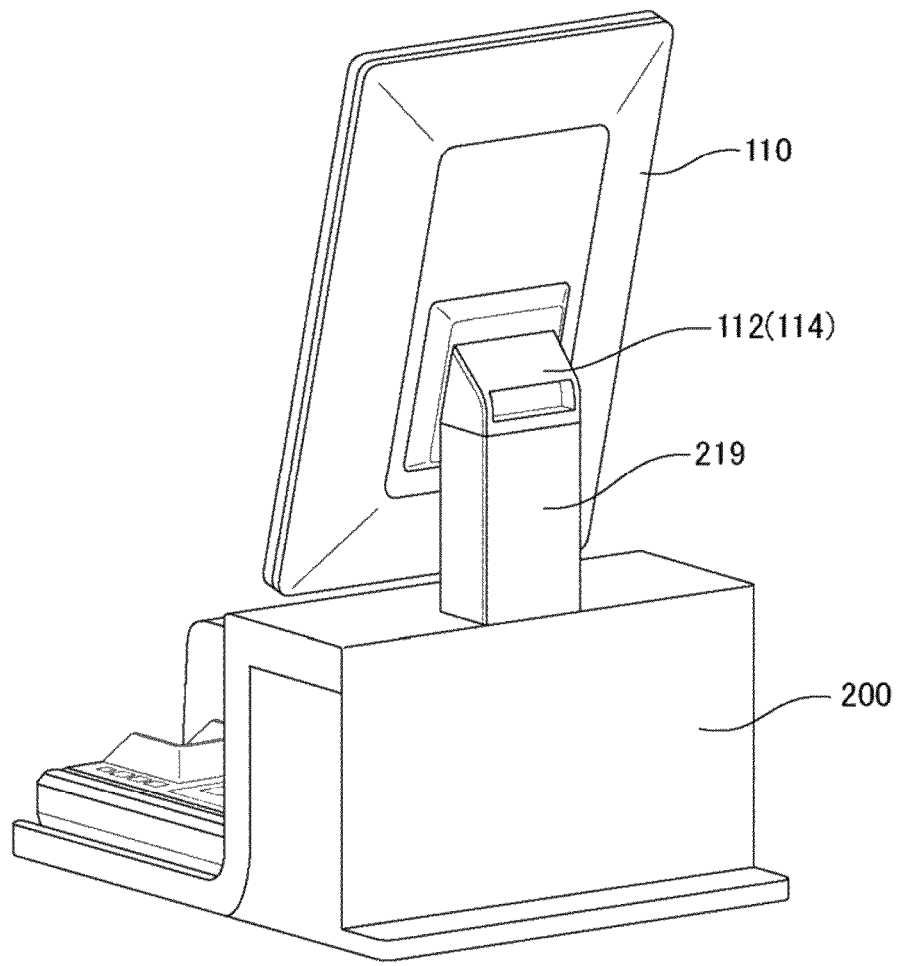
FIG. 3 is a perspective view of the information processing apparatus as viewed from a rear side.
Figure 4:
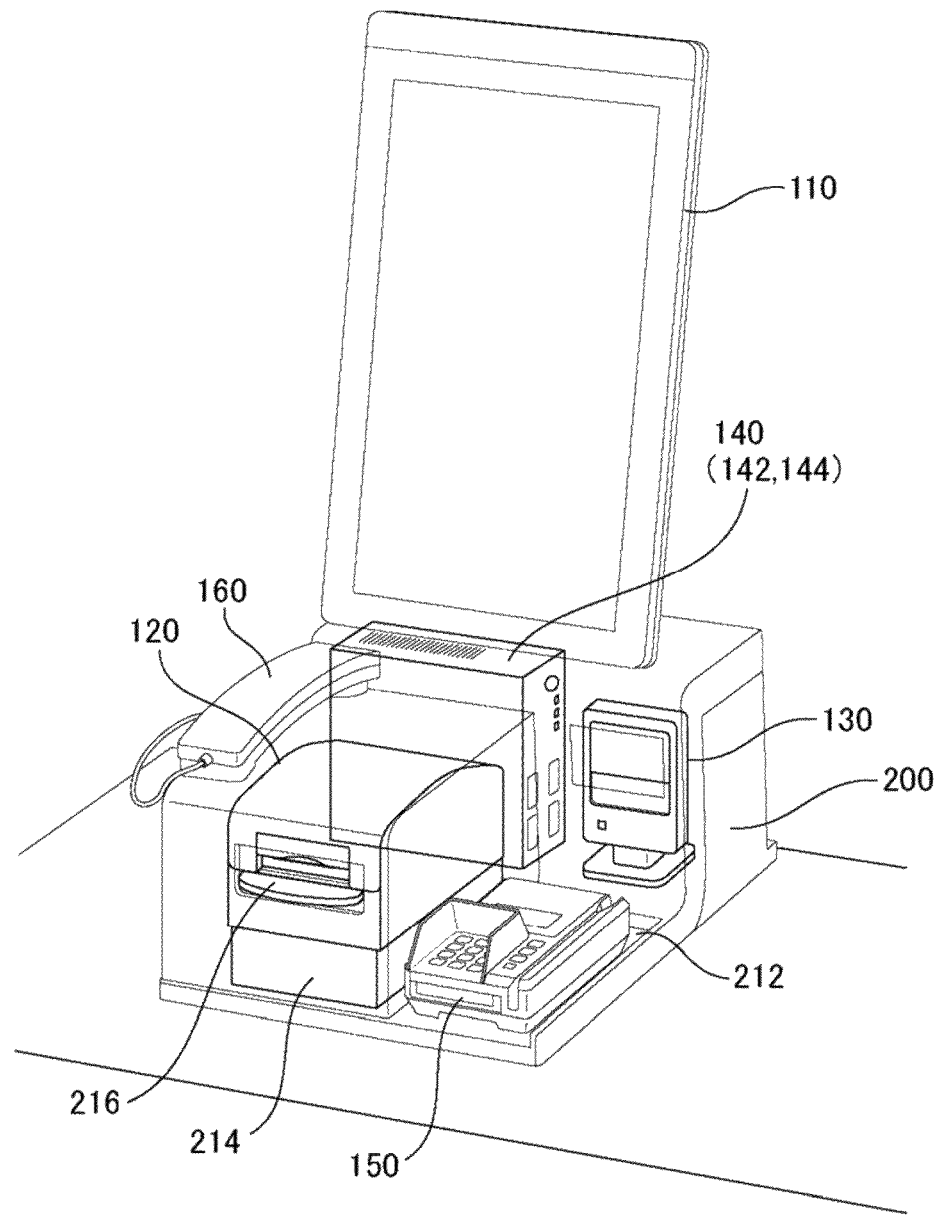
FIG. 4 is a perspective view for describing components included in the information processing apparatus.

FIG. 2 is a perspective view of the information processing apparatus 10 as viewed from a front side, and FIG. 3 is a perspective view of the information processing apparatus 10 as viewed from a rear side. FIG. 4 is a perspective view for describing components included in the information processing apparatus 10, and illustrates a partially transparent state of a base member 200 of the information processing apparatus 10. The information processing apparatus 10 is installed in a store, and is used by, for example, a customer. However, the information processing apparatus 10 may be used by a clerk in at least some applications.

The information processing apparatus 10 includes the display 110 and the base member 200. The base member 200 holds and stores various kinds of members constituting the information processing apparatus 10. One of the members held by the base member 200 is the display 110. The display 110 is rotatably attached to the base member 200 through a holding unit 112.

An axis of rotation of the display 110 is oriented in a direction intersecting a display surface of the display 110. An angle between the axis of rotation and the display surface is, for example, equal to or more than 60° and equal to or less than 120°, but may be outside of the ranges. Further, the angle may be variable. A center of rotation of the display 110 is, for example, any portion of a back face of the display 110. The center of rotation is, for example, a center of the back face, but is not limited to the portion. The display 110 is rotatable by, for example, 360°, but may be rotatable by an angle in a defined range.

The information processing apparatus 10 has a plurality of processing modes for mutually different applications, and operates in any one of the processing modes. The processing mode in which the information processing apparatus 10 operates is determined by an angle of the display 110. The angle of the display 110 is detected by an angle detection unit 114 included in the holding unit 112.

As described by using FIG. 1, the plurality of processing modes of the information processing apparatus 10 include a first mode relevant to a first application and a second mode relevant to a second application different from the first application.

One example of the first application is settlement processing for a product being sold in a store. When functioning in the first mode, the information processing apparatus 10 functions as, for example, a POS terminal. In this case, the information processing apparatus 10 may further have a function of registering a product being sold in a store for settlement processing, that is, a product registration function.

One example of the second application is at least one of the following.

- At least one of reservation and ticketing processing for various kinds of tickets
- Payment processing for a charge (including a utility bill)
- Payment processing for a contract (including sales) made via the Internet.
- At least one of application and payment for an examination and a training
- Enrollment in insurance
- Issuance of various kinds of certificates (including processing entrusted by a local government)

When functioning as the second application, the information processing apparatus 10 may be handled as an information kiosk terminal or a multimedia terminal. Note that, an information kiosk terminal or a multimedia terminal often does not include registration processing and settlement processing for a product being sold in a store. Thus, the second application often does not include settlement processing. Similarly, the second application often does not include registration processing for a product.

Further, the information processing apparatus 10 includes an input/output apparatus and a control unit 140, as illustrated in, for example, FIG. 4. The control unit 140 is stored in the base member 200, and includes the computation processing unit 142 and a storage unit 144.

The computation processing unit 142 changes processing modes of the computation processing unit 142 by using an angle of the display 110 detected by the angle detection unit 114. Specific examples of the processing modes are as described above.

Further, the computation processing unit 142 controls the input/output apparatus. Herein, one example of the input/output apparatus to be controlled by the computation processing unit 142 is, in addition to the above-described display 110, a printing apparatus 120, an information reading apparatus 130, and a card reader 150. Note that, the computation processing unit 142 may cause the input/output apparatus functioning in at least one processing mode to be different from another processing mode.

The storage unit 144 stores information necessary for processing to be performed by the computation processing unit 142. For example, the storage unit 144 stores a program relevant to each of the modes of the information processing apparatus 10. For example, the storage unit 144 has a first program for the information processing apparatus 10 to function as the first mode and a second program for the information processing apparatus 10 to function as the second mode. Then, the computation processing unit 142 determines, according to an angle of the display 110, a program to be used by the control unit 140. The storage unit 144 also stores information necessary for the determination.

The computation processing unit 142 communicates with an external apparatus of the information processing apparatus 10 as needed. For example, when the information processing apparatus 10 performs registration processing for a product, the computation processing unit 142 communicates with a server installed in a store, that is, a store server, and performs registration processing for a product by using information stored in the server. The store server manages a product being sold in the store, and stores, for example, for each of a plurality of products, product identification information, a price, and quantity of stock.

Further, when the information processing apparatus 10 functions as the second application, for example, an information kiosk terminal or a multimedia terminal, the computation processing unit 142 communicates with a server outside a store. One example of information to be handled in the communication is at least one of the following.

Ticket reservation data

At least one of invoice data and payment data for a charge (including a utility bill)

At least one of invoice data and payment data for a contract (including sales) made via the Internet At least one of application data, invoice data, and payment data for an examination and a training Data necessary for enrollment in insurance Data necessary for issuance processing of various kinds of certificates (including processing entrusted by a local government)

As illustrated in FIG. 2, the base member 200 includes a first mounting area 212 and a second mounting area 218 higher than the first mounting area 212. Each of the first mounting area 212 and the second mounting area 218 is a horizontal plane.

The first mounting area 212 is an area where the input/output apparatus is mounted. A part of the first mounting area 212 is covered by a first accommodation unit 214. The first accommodation unit 214 has a shape of, for example, a hollow box-like member (for example, a hollow cuboid) without a bottom face. The bottom face of the first accommodation unit 214 is closed by the first mounting area 212. In the present figure, a left-side area of the first mounting area 212 as viewed from a customer is covered by the first accommodation unit 214.

Then, the card reader 150 is mounted in an area of the first mounting area 212 that is not covered by the first accommodation unit 214. The card reader 150 reads, for example, from a credit card, information (for example, a card number) of the credit card, and outputs the information to the control unit 140.

The printing apparatus 120 is mounted in an area of the first mounting area 212 that is covered by the first accommodation unit 214. The printing apparatus 120 prints, for example, at least one of a receipt, a ticket, and a certificate. Note that, items printed by the printing apparatus 120 are not limited thereto. Then, a face (that is, a front face) of the first accommodation unit 214 that faces a customer has an opening 216 for discharging a printed item.

Note that, a handset 160 is placed on the first accommodation unit 214. The handset 160 is provided in order that, for example, a customer talks to an external operator or a clerk in a store via the control unit 140.

The second mounting area 218 is located above the first mounting area 212. Then, the display 110 is placed on the second mounting area 218. The display 110 has, for example, a touch panel function, and functions also as an input apparatus by being operated by a customer. Note that, a backrest unit 219 stands upward from an end of the second mounting area 218 opposite from a customer. The backrest unit 219 is an area located behind the display 110, and is provided in order to support a rear face of the display 110. As illustrated in FIG. 3, the rear face of the display 110 is rotatably fixed to an upper end of the backrest unit 219 through the holding unit 112.

Further, as illustrated in FIG. 4, the information reading apparatus 130 and the control unit 140 are accommodated inside a portion of the base member 200 that is the second mounting area 218.

The information reading apparatus 130 is an apparatus that reads information by using an electromagnetic wave (including light). The information reading apparatus 130 may be a code reader that reads code information such as a barcode or a two-dimensional code, may be an imaging apparatus that images a product, or may have both functions thereof.

Further, as illustrated in FIG. 2, a portion of a front face of the second mounting area 218 that faces the information reading apparatus 130 is an electromagnetic wave transmission area 232. The electromagnetic wave transmission area 232 is an area through which an electromagnetic wave for the information reading apparatus 130 to read information is transmitted, and may be, for example, a window made of glass or resin, or an opening. Note that, at least a part of the electromagnetic wave transmission area 232 overlaps the card reader 150 in a width direction (a left-right direction when viewed from a customer) of the information processing apparatus 10. In other words, the electromagnetic wave transmission area 232 is located at an upper portion of the front face behind the card reader 150.

Figure 5:
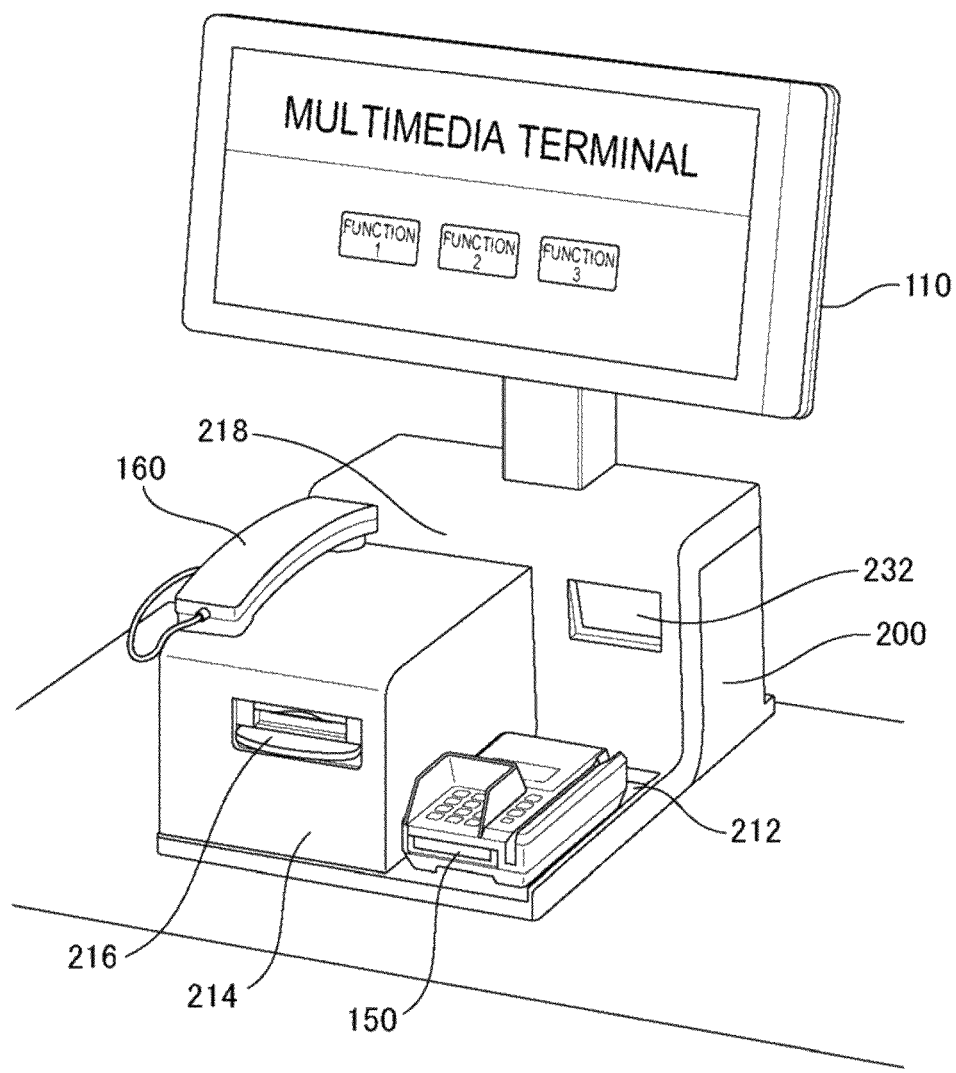
FIG. 5 is a perspective view of the information processing apparatus when an angle of a display is changed from FIG. 1.

FIG. 5 is a perspective view of the information processing apparatus 10 when an angle of the display 110 is changed from the example illustrated in FIG. 2. A difference between an angle of the display 110 illustrated in FIG. 5 and an angle of the display 110 illustrated in FIG. 2 is equal to or more than 80° and equal to or less than 100°. When the display 110 is rectangular, the display 110 illustrated in FIG. 2 is one of vertically long and horizontally long, and the display 110 illustrated in FIG. 5 is another of vertically long and horizontally long. However, when the display 110 is square or rectangular, a difference between an angle of the display 110 illustrated in FIG. 5 and an angle of the display 110 illustrated in FIG. 2 may be equal to or more than 170° and equal to or less than 190°. In this case, there is little difference between a state of the display 110 illustrated in FIG. 2 and a state of the display 110 illustrated in FIG. 5.

Then, the processing mode of the information processing apparatus 10 illustrated in FIG. 5 is different from the processing mode of the information processing apparatus 10 illustrated in FIG. 2. Then, due to the difference between the processing modes, a start screen that the display 110 first provides to a user is different from the example illustrated in FIG. 2. In other words, a start screen that the display 110 first provides to a user differs depending on the processing mode of the information processing apparatus 10.

For example, in the example illustrated in FIG. 2, the display 110 indicates a start screen in the first mode. In the example, the first mode has a settlement function for a product. Note that, the first mode may further have a registration function for a product.

Then, in the example illustrated in FIG. 5, the display 110 indicates a start screen in the second mode. In the example, the second mode has a function as an information kiosk terminal or a multimedia terminal. Then, the start screen has selectable icons relevant to a plurality of second applications. Examples of the plurality of second applications are as described by using FIG. 2.

Note that, in the example illustrated in FIG. 5, the display 110 may be in a state of being rotated in a range of equal to or more than 170° and equal to or less than 190° from a state illustrated in FIG. 2. In this case, the display 110 is in an identical state, for example, a vertically long state (or a horizontally long state) in both of the first mode and the second mode.

Figure 6:
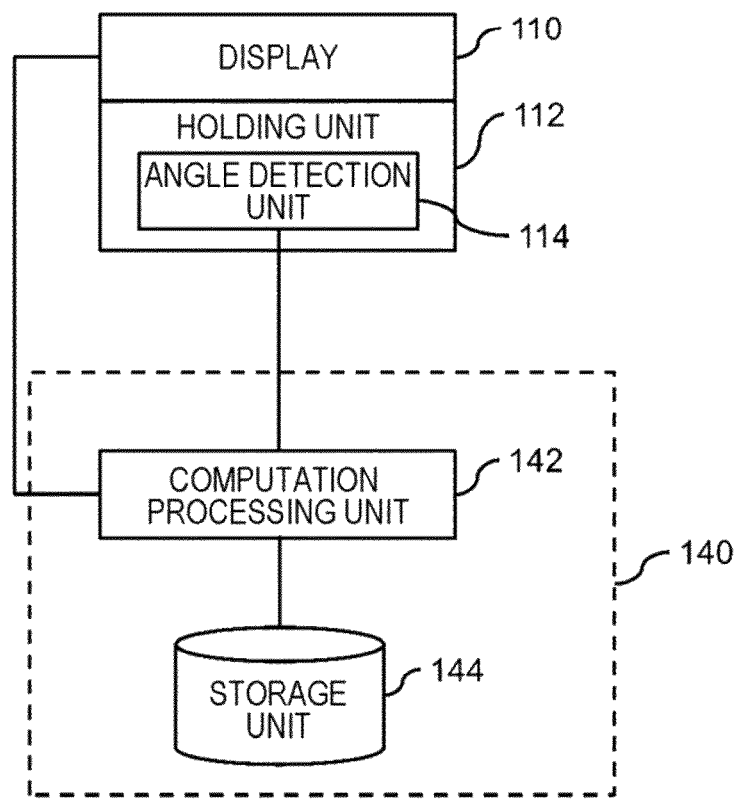
FIG. 6 is a diagram illustrating one example of a key part of a functional configuration of the information processing apparatus.

FIG. 6 is a diagram illustrating one example of a key part of a functional configuration of the information processing apparatus 10. As described above, the display 110 is rotatably attached to the base member 200 illustrated in FIG. 2 by using the holding unit 112. Then, the holding unit 112 includes the angle detection unit 114. The angle detection unit 114 generates information indicating an angle of the display 110, and outputs the information to the computation processing unit 142 of the control unit 140.

As described above, the storage unit 144 stores a program relevant to each of the modes of the information processing apparatus 10. Furthermore, the storage unit 144 stores relevant data. The relevant data indicate an angle at which the processing mode is to be performed for each of a plurality of processing modes. The relevant data are, for example, but not limited to, a table-format data. Then, the computation processing unit 142 determines, by using the relevant data and the information acquired from the angle detection unit 114, a processing mode to be achieved by the information processing apparatus 10, and functions in the determined processing mode.

Note that, the relevant data are, for example, data in which two processing modes and ranges of angles relevant to the two processing modes are associated with each other, but may be data in which equal to or more than three processing modes and ranges of angles relevant to the equal to or more than three processing modes are associated with each other.

Figure 7:
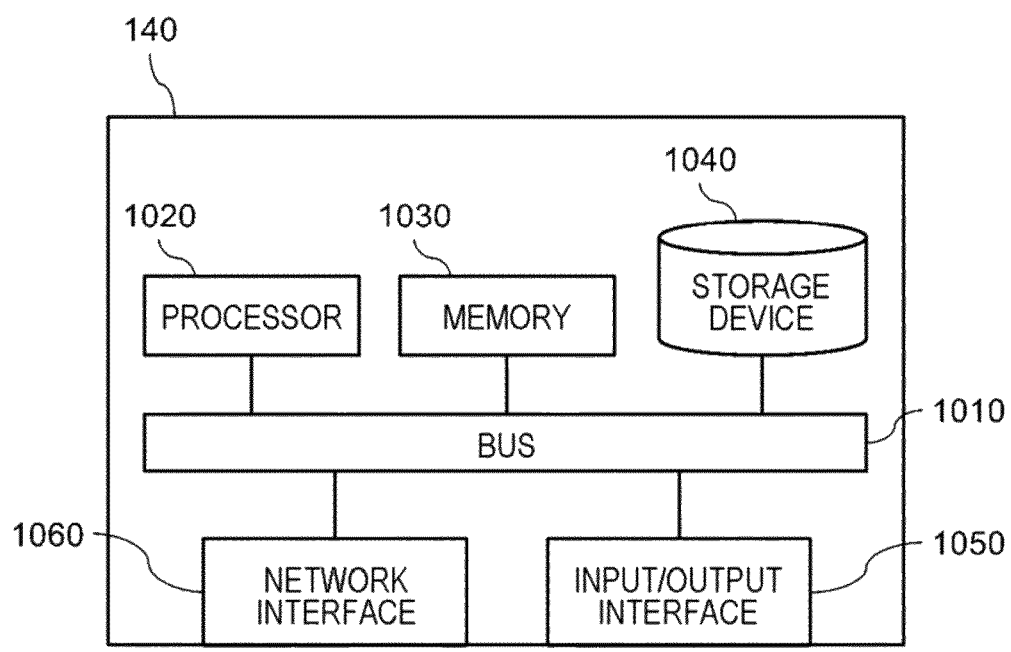
FIG. 7 is a diagram illustrating a hardware configuration example of a control unit.

FIG. 7 is a diagram illustrating a hardware configuration example of the control unit 140. The control unit 140 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit and receive data to and from one another. However, a method of connecting the processor 1020 and the like with one another is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a removable medium such as a memory card, a read only memory (ROM), or the like. The storage device 1040 stores program modules for achieving functions (for example, the computation processing unit 142) of the control unit 140. Each of the program modules is read in to the memory 1030 and executed by the processor 1020, and thereby each function relevant to the program module is achieved. Further, the storage device 1040 also functions as the storage unit 144.

The input/output interface 1050 is an interface for connecting the control unit 140 to various kinds of input/output equipment. For example, the control unit 140 communicates with the angle detection unit 114 via the input/output interface 1050.

The network interface 1060 is an interface for connecting the control unit 140 to a network. The network is, for example, a local area network (LAN) or a wide area network (WAN). A method by which the network interface 1060 connects to a network may be wireless communication, or may be wired communication. The control unit 140 may communicate with a server installed in a store or a server outside the store via the network interface 1060.

As described above, according to the present example embodiment, the information processing apparatus 10 is used in a store, and includes the display 110 and the computation processing unit 142. The display 110 is capable of rotating. Then, the computation processing unit 142 changes processing modes according to an angle of the display 110. The processing modes include a first mode relevant to a first application and a second mode relevant to a second application different from the first application. In this way, the information processing apparatus 10 is able to switch applications according to an orientation of a display.

While the example embodiment of the present invention has been described with reference to the drawings, the example embodiment is illustrative of the present invention, and various configurations other than the above can be employed.

The whole or part of the above-described example embodiment can be described as, but not limited to, the following supplementary notes.

1. An information processing apparatus being used in a store, including:
    a display capable of rotating about an axis of rotation in a direction intersecting a display surface; and
    a computation processing unit that changes processing modes according to an angle of the display, wherein
    the processing mode includes a first mode relevant to a first application and a second mode relevant to a second application different from the first application.

2. The information processing apparatus according to supplementary note 1, wherein
    the first application is settlement processing for a product being sold in the store.

3. The information processing apparatus according to supplementary note 2, wherein
    the first mode further has a registration function for the product, and
    the computation processing unit
        executes, in the first mode, product registration processing by using information being stored in a server inside the store, and
        acquires, in the second mode, information from a server outside the store.

4. The information processing apparatus according to supplementary note 2 or 3, wherein
    the second application does not include settlement processing for a product being sold in the store.

5. The information processing apparatus according to any one of supplementary notes 1 to 4, wherein
    the second application is at least one of: at least one of ticket reservation and ticketing processing; payment processing for a charge; payment processing for a contract made via the Internet; at least one of application and payment for an examination and a training; enrollment in insurance; and issuance of a certificate.

6. The information processing apparatus according to any one of supplementary notes 1 to 5, wherein
the computation processing unit changes, according to the processing mode, a start screen to be first provided to a user.

7. The information processing apparatus according to supplementary note 6, wherein
the second mode is relevant to a plurality of second applications, and
a start screen in the second mode has selectable icons relevant to the plurality of second applications.

8. The information processing apparatus according to any one of supplementary notes 1 to 7, wherein
the computation processing unit determines the processing mode to be executed, by using relevant data indicating the angle at which the processing mode is to be performed for each of a plurality of the processing modes.

9. The information processing apparatus according to any one of supplementary notes 1 to 8, wherein
a difference between the angle at which the first mode is to be performed and the angle at which the second mode is to be performed is equal to or more than 80° and equal to or less than 100°.

10. The information processing apparatus according to any one of supplementary notes 1 to 8, wherein
the display is square or rectangular, and
a difference between the angle at which the first mode is to be performed and the angle at which the second mode is to be performed is equal to or more than 170° and equal to or less than 190°

11. A control method of an information processing apparatus controlling a processing mode of an information processing apparatus being used in a store,
the information processing apparatus including a display capable of rotating about an axis of rotation in a direction intersecting a display surface,
the control method including changing processing modes of the information processing apparatus according to an angle of the display, wherein
the processing mode includes a first mode relevant to a first application and a second mode relevant to a second application different from the first application.

12. The control method of the information processing apparatus according to supplementary note 11, wherein
the first application is settlement processing for a product being sold in the store.

13. The control method of the information processing apparatus according to supplementary note 12, wherein
the first mode further has a registration function for the product, and
the information processing apparatus
executes, in the first mode, product registration processing by using information being stored in a server inside the store, and
acquires, in the second mode, information from a server outside the store.

14. The control method of the information processing apparatus according to supplementary note 12 or 13, wherein
the second application does not include settlement processing for a product being sold in the store.

15. The control method of the information processing apparatus according to any one of supplementary notes 11 to 14, wherein the second application is at least one of: at least one of ticket reservation and ticketing processing; payment processing for a charge; payment processing for a contract made via the Internet; at least one of application and payment for an examination and a training; enrollment in insurance; and issuance of a certificate.

16. The control method of the information processing apparatus according to any one of supplementary notes 11 to 15, wherein
the information processing apparatus changes, according to the processing mode, a start screen to be first provided to a user.

17. The control method of the information processing apparatus according to supplementary note 16, wherein
the second mode is relevant to a plurality of second applications, and
a start screen in the second mode has selectable icons relevant to the plurality of second applications.

18. The control method of the information processing apparatus according to any one of supplementary notes 11 to 17, wherein
the information processing apparatus determines the processing mode to be executed, by using relevant data indicating the angle at which the processing mode is to be performed for each of a plurality of the processing modes.

19. The control method of the information processing apparatus according to any one of supplementary notes 11 to 18, wherein
a difference between the angle at which the first mode is to be performed and the angle at which the second mode is to be performed is equal to or more than 80° and equal to or less than 100°.

20. The control method of the information processing apparatus according to any one of supplementary notes 11 to 18, wherein
the display is square or rectangular, and
a difference between the angle at which the first mode is to be performed and the angle at which the second mode is to be performed is equal to or more than 170° and equal to or less than 190°.

21. A storage medium storing a program executable by a computer being used as a part of an information processing apparatus in a store,
the information processing apparatus including a display capable of rotating about an axis of rotation in a direction intersecting a display surface,
the program causing the computer to include:
a function of acquiring angle information indicating an angle of the display; and
a function of changing processing modes of the information processing apparatus according to an angle of the display included in the information processing apparatus, wherein
the processing mode includes a first mode relevant to a first application and a second mode relevant to a second application different from the first application.

22. The storage medium according to supplementary note 21, wherein
the first application is settlement processing for a product being sold in the store.

23. The storage medium according to supplementary note 22, wherein
the first mode further has a registration function for the product, and
the computer executes, in the first mode, product registration processing by using information being stored in a server inside the store, and
acquires, in the second mode, information from a server outside the store.

24. The storage medium according to supplementary note 22 or 23, wherein
the second application does not include settlement processing for a product being sold in the store.

25. The storage medium according to any one of supplementary notes 21 to 24, wherein
the second application is at least one of: at least one of ticket reservation and ticketing processing; payment processing for a charge; payment processing for a contract made via the Internet; at least one of application and payment for an examination and a training; enrollment in insurance; and issuance of a certificate.

26. The storage medium according to any one of supplementary notes 21 to 25, wherein
the computer changes, according to the processing mode, a start screen to be first provided to a user.

27. The storage medium according to supplementary note 26, wherein
the second mode is relevant to a plurality of second applications, and
a start screen in the second mode has selectable icons relevant to the plurality of second applications.

28. The storage medium according to any one of supplementary notes 21 to 27, wherein
the computer determines the processing mode to be executed, by using relevant data indicating the angle at which the processing mode is to be performed for each of a plurality of the processing modes.

29. The storage medium according to any one of supplementary notes 21 to 28, wherein
a difference between the angle at which the first mode is to be performed and the angle at which the second mode is to be performed is equal to or more than 80° and equal to or less than 100°.

30. The storage medium according to any one of supplementary notes 21 to 28, wherein
the display is square or rectangular, and
a difference between the angle at which the first mode is to be performed and the angle at which the second mode is to be performed is equal to or more than 170° and equal to or less than 190°.

31. A program executable by a computer being used as a part of an information processing apparatus in a store,
the information processing apparatus including a display capable of rotating about an axis of rotation in a direction intersecting a display surface,
the program causing the computer to include:
a function of acquiring angle information indicating an angle of the display; and
a function of changing processing modes of the information processing apparatus according to an angle of the display included in the information processing apparatus, wherein
the processing mode includes a first mode relevant to a first application and a second mode relevant to a second application different from the first application.

32. The program according to supplementary note 31, wherein
the first application is settlement processing for a product being sold in the store.

33. The program according to supplementary note 32, wherein
the first mode further has a registration function for the product, and
the computer
executes, in the first mode, product registration processing by using information being stored in a server inside the store, and
acquires, in the second mode, information from a server outside the store.

34. The program according to supplementary note 32 or 33, wherein
the second application does not include settlement processing for a product being sold in the store.

35. The program according to any one of supplementary notes 31 to 34, wherein
the second application is at least one of: at least one of ticket reservation and ticketing processing; payment processing for a charge; payment processing for a contract made via the Internet; at least one of application and payment for an examination and a training; enrollment in insurance; and issuance of a certificate.

36. The program according to any one of supplementary notes 31 to 35, wherein
the computer changes, according to the processing mode, a start screen to be first provided to a user.

37. The program according to supplementary note 36, wherein
the second mode is relevant to a plurality of second applications, and
a start screen in the second mode has selectable icons relevant to the plurality of second applications.

38. The program according to any one of supplementary notes 31 to 37, wherein
the computer determines the processing mode to be executed, by using relevant data indicating the angle at which the processing mode is to be performed for each of a plurality of the processing modes.

39. The program according to any one of supplementary notes 31 to 38, wherein
a difference between the angle at which the first mode is to be performed and the angle at which the second mode is to be performed is equal to or more than 80° and equal to or less than 100°.

40. The program according to any one of supplementary notes 31 to 39 21 to 28, wherein
the display is square or rectangular, and
a difference between the angle at which the first mode is to be performed and the angle at which the second mode is to be performed is equal to or more than 170° and equal to or less than 190°.

REFERENCE SIGNS LIST

10 Information processing apparatus
110 Display
112 Holding unit
114 Angle detection unit
120 Printing unit
130 Information reading unit
140 Control unit
142 Computation processing unit
144 Storage unit
150 Card reader
160 Call unit
200 Base member

What is claimed is:
1. An information processing apparatus being used in a store, comprising:

a display capable of rotating about an axis of rotation in a direction intersecting a display surface;

at least one memory configured to store instructions; and at least one processor configured to execute the instructions to perform operations comprising:

changing processing modes according to an angle of the display relative to the axis of rotation, wherein the processing mode includes a first mode relevant to a first application and a second mode relevant to a plurality of second applications different from the first application; and changing according to the processing mode, a start screen to be first provided to a user, wherein the start screen, in the second mode, has selectable icons relevant to the plurality of second applications.

2. The information processing apparatus according to claim 1, wherein the first application is settlement processing for a product being sold in the store.

3. The information processing apparatus according to claim 2, wherein the first mode further has a registration function for the product, and executing, in the first mode, product registration processing by using information being stored in a server inside the store, and acquiring, in the second mode, information from a server outside the store.

4. The information processing apparatus according to claim 2, wherein the plurality of second applications does not include settlement processing for a product being sold in the store.

5. The information processing apparatus according to claim 1, wherein the plurality of second applications includes is at least one of: at least one of ticket reservation and ticketing processing; payment processing for a charge; payment processing for a contract made via the Internet; at least one of application and payment for an examination and a training; enrollment in insurance; and issuance of a certificate.

6. The information processing apparatus according to claim 1, wherein determining the processing mode to be executed, by using relevant data indicating the angle at which the processing mode is to be performed for each processing mode.

7. The information processing apparatus according to claim 1, wherein a difference between the angle at which the first mode is to be performed and the angle at which the second mode is to be performed is equal to or more than 80° and equal to or less than 100°.

8. The information processing apparatus according to claim 1, wherein the display is square or rectangular, and a difference between the angle at which the first mode is to be performed and the angle at which the second mode is to be performed is equal to or more than 170° and equal to or less than 190°.

9. The information processing apparatus according to claim 1, wherein the display surface is a face of the display.

10. A control method for an information processing apparatus comprising a display capable of rotating about an axis of rotation in a direction intersecting a display surface, the control method comprising:

changing processing modes of the information processing apparatus according to an angle of the display relative to the axis of rotation, wherein the processing mode includes a first mode relevant to a first application and a second mode relevant to a a plurality of second applications different from the first application; and changing according to the processing mode, a start screen to be first provided to a user, wherein the start screen, in the second mode, has selectable icons relevant to the plurality of second applications.

11. The control method according to claim 10, wherein the display surface is a face of the display.

12. A non-transitory storage medium storing a program executable by a computer being used as a part of an information processing apparatus in a store, the information processing apparatus including a display capable of rotating about an axis of rotation in a direction intersecting a display surface, the program causing the computer to perform operations comprising:

acquiring angle information indicating an angle of the display;

changing processing modes of the information processing apparatus according to an angle of the display relative to the axis of rotation included in the information processing apparatus, wherein the processing mode includes a first mode relevant to a first application and a second mode relevant to a a plurality of second applications different from the first application; and changing, according to the processing mode, a start screen to be first provided to a user, wherein the start screen, in the second mode, has selectable icons relevant to the plurality of second applications.

13. The non-transitory storage medium according to claim 12, wherein the display surface is a face of the display.

* * * * *